(12) United States Patent
Bainbridge

(10) Patent No.: US 11,076,143 B1
(45) Date of Patent: *Jul. 27, 2021

(54) IN-BAND TEAR DETECTION WITH COMPRESSION

(71) Applicant: Facebook Technologies, LLC, Menlo Park, CA (US)

(72) Inventor: Lyle David Bainbridge, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/839,653

(22) Filed: Dec. 12, 2017

Related U.S. Application Data

(60) Provisional application No. 62/433,117, filed on Dec. 12, 2016.

(51) Int. Cl.

| | |
|---|---|
| *H04N 19/89* | (2014.01) |
| *H04N 13/167* | (2018.01) |
| *H04N 13/133* | (2018.01) |
| *H04N 13/139* | (2018.01) |
| *H04N 13/15* | (2018.01) |
| *H04N 13/161* | (2018.01) |

(52) U.S. Cl.
CPC ......... *H04N 13/167* (2018.05); *H04N 13/133* (2018.05); *H04N 13/139* (2018.05); *H04N 13/15* (2018.05); *H04N 13/161* (2018.05); *H04N 19/89* (2014.11)

(58) Field of Classification Search
None
See application file for complete search history.

(56) References Cited

U.S. PATENT DOCUMENTS

| | | | |
|---|---|---|---|
| 6,046,735 A * | 4/2000 | Bassetti | G09G 3/2096 345/204 |
| 6,205,231 B1 * | 3/2001 | Isadore-Barreca | G06K 9/32 375/E7.081 |
| 6,408,409 B1 * | 6/2002 | Williams | G06F 5/10 714/719 |
| 6,523,114 B1 * | 2/2003 | Barton | G06T 1/0028 348/E7.056 |
| 7,546,480 B1 * | 6/2009 | Swenson | G06F 5/14 345/558 |
| 7,769,306 B2 * | 8/2010 | Able | G03G 15/0865 399/12 |

(Continued)

*Primary Examiner* — Shadan E Haghani
(74) *Attorney, Agent, or Firm* — Fenwick & West LLP

(57) ABSTRACT

A system detects a screen tear in a display device for frames of video by retrieving an identification code associated with each pixel row of the frame of video and analyzing identification codes across the pixel rows of the frame of the video to detect occurrence of a screen tear. To support compressed (e.g., lossy) video data, the identification code associated with each pixel row of the frame of video is inserted into the most significant bit (or bits) of a color channel of a first pixel of the pixel row. Identification codes across the pixel rows of the frame of the video are then compared for tear detection. Because modification of the most significant bit of a color channel of a pixel may result in color distortion, the pixels including inserted identification codes are hidden from view by the display device.

14 Claims, 6 Drawing Sheets

(56) References Cited

U.S. PATENT DOCUMENTS

| | | | | |
|---|---|---|---|---|
| 8,347,344 B2* | 1/2013 | Makhija | ............ | H04N 21/2402 |
| | | | | 725/116 |
| 9,424,619 B2* | 8/2016 | Fung | ................ | G03B 19/00 |
| 9,578,373 B2* | 2/2017 | Agrawal | ............ | G06F 11/3409 |
| 9,584,696 B2* | 2/2017 | Beck | ................ | H04N 1/32277 |
| 9,866,724 B2* | 1/2018 | Kurkure | ............ | H04N 1/32219 |
| 10,019,968 B2* | 7/2018 | Bi | ............ | G09G 5/39 |
| 10,147,463 B2* | 12/2018 | Staudenmaier | ...... | G11B 27/326 |
| 10,306,202 B2* | 5/2019 | Raghoebardajal | .. | A63F 13/5252 |
| 2015/0243937 A1* | 8/2015 | Dinh | ................ | G03B 15/03 |
| | | | | 429/163 |
| 2017/0213526 A1* | 7/2017 | Hara | ................ | H04N 5/66 |
| 2018/0081429 A1* | 3/2018 | Akenine-Moller | ..... | G06F 3/011 |

\* cited by examiner

500

For each pixel row of a video frame defined by compressed video data, insert an identification code in one or more of the most significant bits of a pixel of the pixel row
505

↓

Generate the frame of video by decoding the compressed video data
510

↓

Send the frame of video to an electronic display
520

FIG. 5

IN-BAND TEAR DETECTION WITH COMPRESSION

CROSS REFERENCE TO RELATED APPLICATION

This application claims the benefit of U.S. Provisional Application No. 62/433,117, filed on Dec. 12, 2016, which is incorporated by reference in its entirety.

BACKGROUND

This invention relates generally to display devices, and more particularly to performing in-band tear detection while displaying video on display devices.

Latency can be a serious problem for virtual reality (VR) systems. Latency is perceived by the brain in a virtual reality (VR) environment, at best, as misaligned with expectations and, at worst, disorienting and potentially nauseating or dizzying. If latency exists in the presentation of a VR environment responsive to user-generated head motion and position data, the presented VR environment appears to "drag" behind a user's actual motion or may become choppy or non-responsive to user movement. Accordingly, latency is generally reduced to improve user experience in a VR environment.

Reducing latency can cause an increased risk of causing screen tears in the displayed video. A screen tear occurs when the rendered video being displayed includes data from two separate video frames instead of only one video frame. Conventionally, a probability of the occurrence of screen tear is controlled by separating a video frame buffer that is being scanned from the video frame buffer that is being refreshed with new data. To reduce latency, the same frame buffer that is being refreshed with new data can also be scanned soon after the frame buffer is refreshed with new data. Scanning of the video frame data increases a chance of the occurrence of a screen tear and also makes the detection of such screen tear important.

SUMMARY

A method for detecting screen tear in a display device for a given frame of video being displayed on the display device is described. For each pixel row of the frame of video, an identification code from one or more most significant bits of a (e.g., first, left-most) pixel of the pixel row is retrieved. The method further includes detecting a mismatch between identification codes of at least two of the pixel rows of the frame of video, and outputting a signal indicating an occurrence of a screen tear in the frame of video responsive to detecting the mismatch.

The frame of video may include decoded compressed video data. The method may include inserting the identification code associated with each pixel row of the frame of video into the compressed video data, and generating the frame of video by decoding the compressed video data. As discussed in greater detail herein, the identification code is inserted at the one or more most significant bits of a pixel because the least significant bits are subject to change when compressed video data is decoded prior to display.

Modification of the most significant bit of a pixel of a color channel may result in significant, noticeable, or otherwise unacceptable color change in the pixel, and thus an opaque element may be provided to occlude the pixels including the identification code from user view on the display device.

Some embodiments include a system including a display panel, one or more line buffers, and a timing controller. The one or more line buffers store at least a portion of a frame of video. For each pixel row of the frame of video, the timing controller retrieves an identification code from one or more most significant bits of a first pixel of the pixel row. The timing controller detects a mismatch between identification codes of at least two of the pixel rows of the frame of video. Responsive to detecting the mismatch the timing controller outputs a signal indicating an occurrence of a screen tear in the frame of video. An indication of the detected screen tear may be provided to the host machine to re-render the frame of video without such screen tear, or to change device configurations to prevent subsequent screen tear.

BRIEF DESCRIPTION OF THE DRAWINGS

FIG. 5 is a flow chart of a process for generating a frame of video including identification codes from compressed video data, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
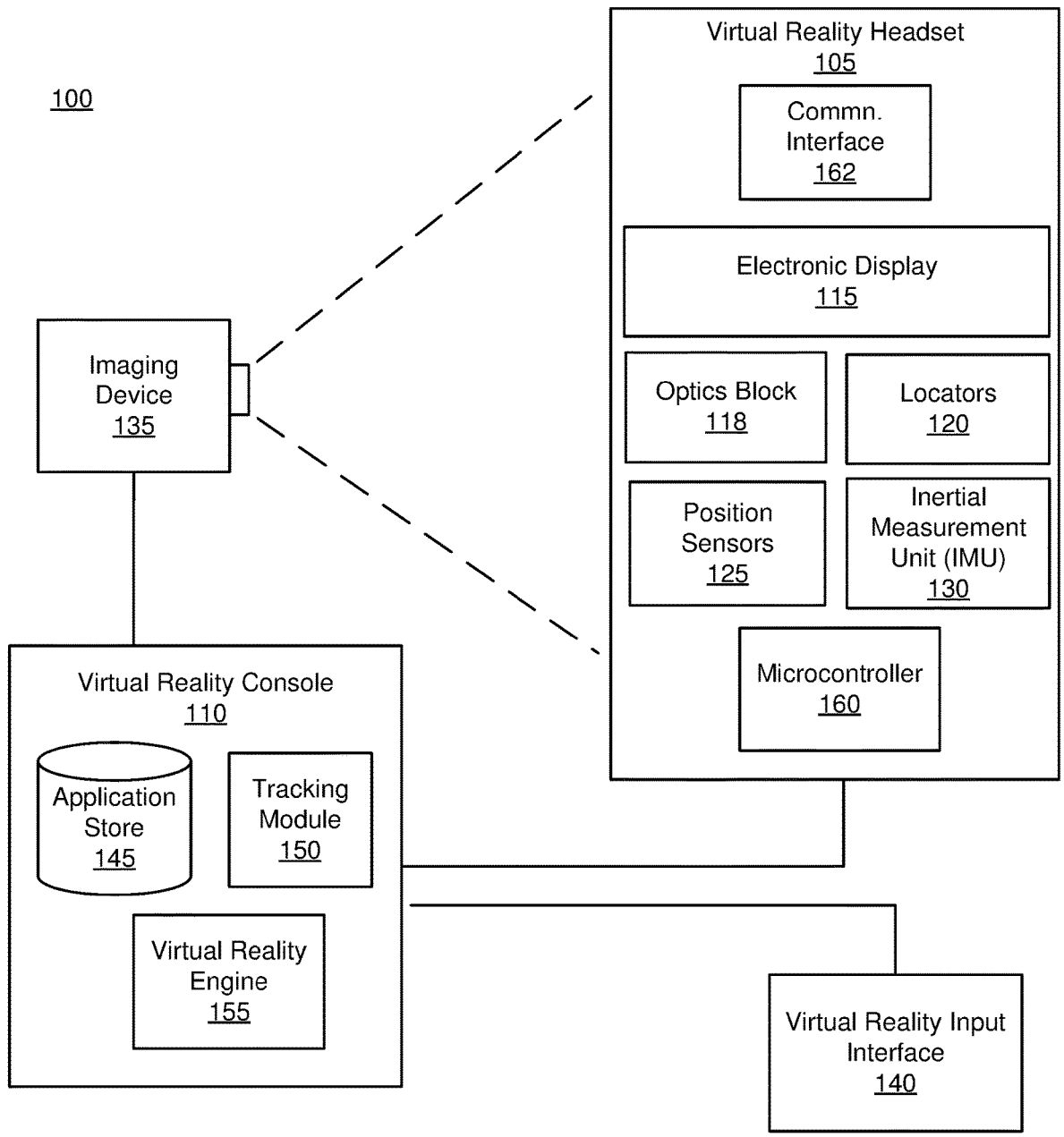
FIG. 1 is a block diagram of a system environment including a virtual reality system, in accordance with an embodiment.

FIG. 1 is a block diagram of a virtual reality (VR) system environment 100 in which a VR console 110 operates. Although the environment 100 is a VR system, the discussion herein regarding in-band tear detection with compression may be applicable to other types of artificial reality systems, or other types of electronic displays. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes a communication interface 162 (e.g., MIPI), an electronic display 115, an optics block 118, one or more locators 120, one or more position sensors 125, an inertial measurement unit (IMU) 130, and a microcontroller 160. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), a passive-matrix organic light-emitting diode display (PMOLED), some other display, or some combination thereof.

The microcontroller 160 may be a processor, cache, associated random access memory and firmware for enabling the operation of the components of the VR headset 105. The microcontroller 160 may be considered a computing device that includes, for example, an integrated system-on-a-chip, a microcontroller, a desktop or laptop computer, a server computer, a tablet, a smart phone or other mobile device. The computing device may include software and/or hardware for providing functionality and features described herein. The computing device may therefore include one or more of: memories, analog circuits, digital circuits, software, firmware and processors. The hardware and firmware components of the computing device may include various specialized units, circuits, software and interfaces for providing the functionality and features described herein.

The computing device includes a processor coupled to a memory, storage, a network interface and an I/O interface. The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage provides non-volatile, bulk or long term storage of data or instructions in the computing device. The storage may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards and USB devices.

Figure 3:
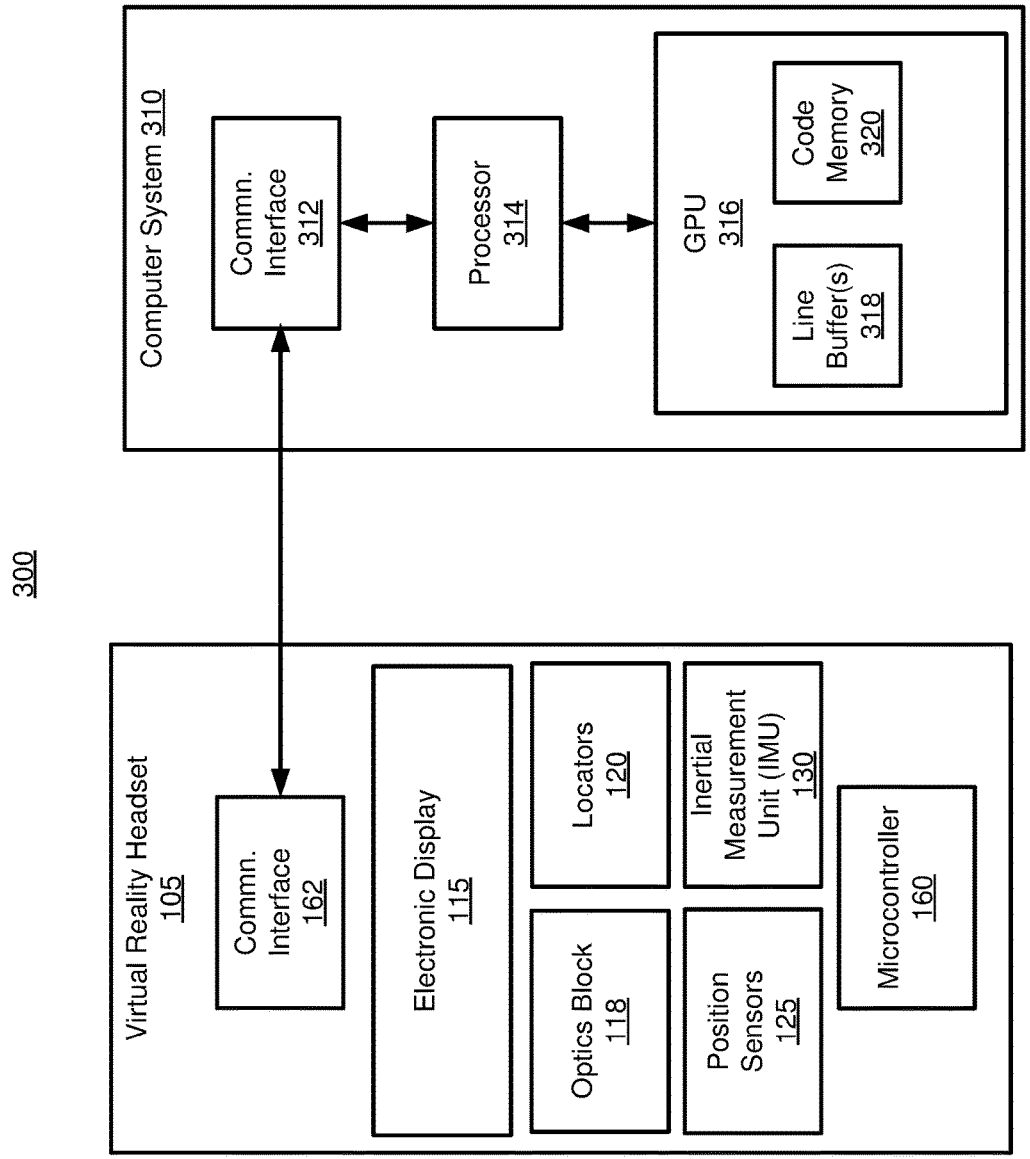
FIG. 3 is a block diagram of an in-band tear detection system, in accordance with an embodiment.

The communications interface 162 enables input and output to external systems, like a computer system as shown in FIG. 3 below. The communications interface 162 may be a single communications channel, such as HDMI, USB, VGA, DVI, or DisplayPort. The communications interface 162 may involve several distinct communications channels operating together or independently. In some embodiments, the communications interface 162 may include wireless connections such as a wireless USB connection for transmitting motion data and control data from the microcontroller 160 to the computer system, but may rely upon an HDMI connection or DVI connection for receipt of audio/visual data that is to be rendered on the electronic display 115. In some embodiments, the VR headset 105 communicates wirelessly with the VR console 110. In some embodiments, some or all of the components of the VR console 110 are integrated with the VR headset 105.

The electronic display 115 includes a display area comprising a plurality of pixels, where each pixel is a discrete light emitting component. In some embodiments, each pixel comprises a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. An example electronic display 115 is described further below with reference to FIG. 4.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all of the user's field of view.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
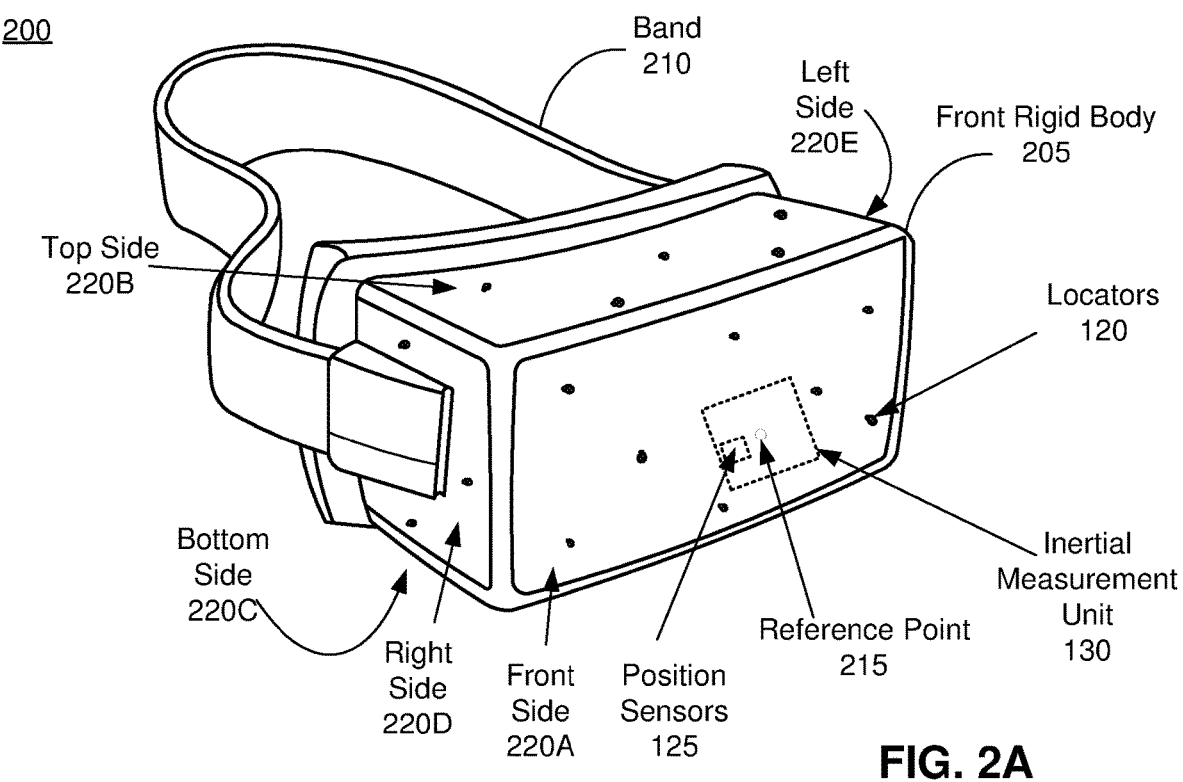
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
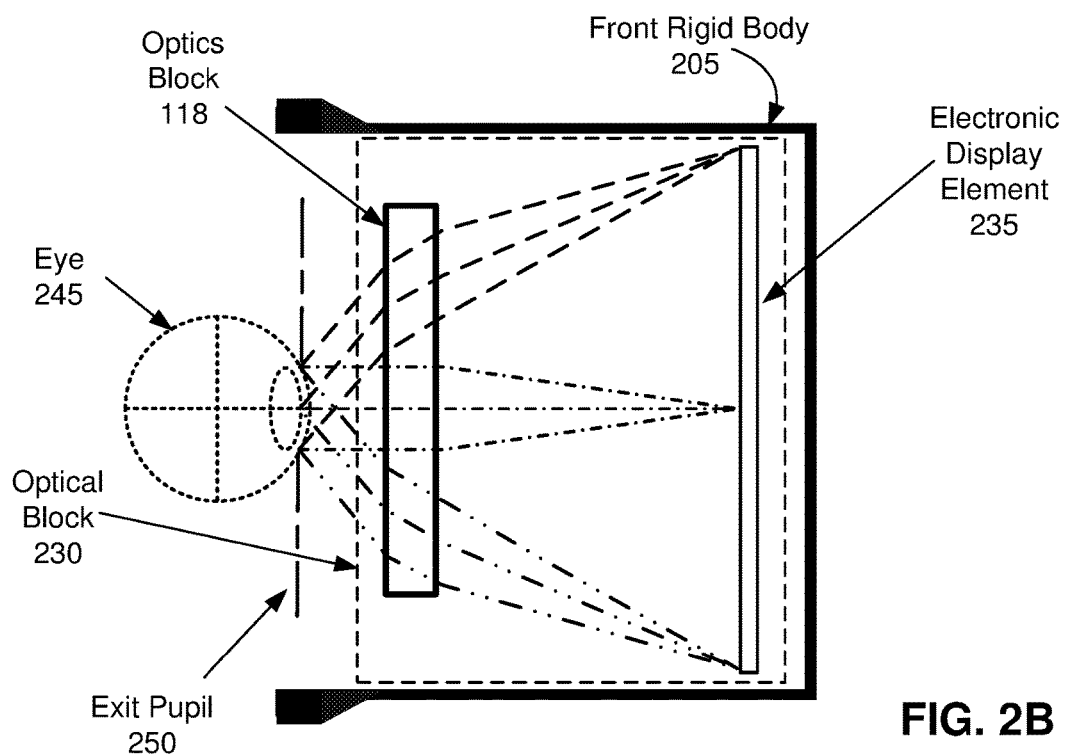
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user. The optical block 230 includes an electronic display element 235 of the electronic display 115, and the optics block 118. An image that may be corrected for any errors is then generated by the optics block 118 magnifying the blurred image light. The optics block 118 directs the corrected image light to the exit pupil 250 for presentation to the user.

FIG. 3 is a block diagram of an in-band tear detection system 300, in accordance with an embodiment. The system includes, among other components, a VR headset 105 or some other type of head-mounted display, and a computer system 310. The computer system 310 includes, among other components, a processor 314, a communications interface 312, and a Graphical Processing Unit (GPU) 316. The computer system 310 may be an example of the VR console 110, as shown in FIG. 1. Here, the processor 314 and GPU 316 may be part of the VR engine 155. In other examples, the computer system 310 is part of the VR headset 105.

The processor 314 of computer system 310 may be a general purpose processor including cache and having instructions, for example, an operating system and associated drivers, for interfacing with the VR headset 105.

The communications interface 312 is identical to the communications interface 162 described above with reference to FIG. 1. The communications interface 312 enables the VR headset 105 to communicate data, such as motion data, control data, and color sensor information to the computer system 310. The communications interface 312 also enables the computer system 310 to communicate control data and driver instructions, along with rendered video data to the VR headset 105. For example, instructions may be transmitted back and forth across a USB connection between the VR headset 105 and the computer system 310, while audio/video data is provided to the VR headset display (e.g., electronic display 115) via a HDMI connection.

The GPU 316 receives instructions from the processor 314 and renders (e.g., three-dimensional) images that correspond to those instructions. Specifically, virtual environment software programs (such as an interactive computer game) provide instructions to the processor 314 and the GPU 316 that are then converted by the processor 314 and GPU 316 into virtual reality environments that are shown on the display 115.

The VR headset 105 generates data from various sensors (e.g., position sensors 125) that is combined into motion and position data before transmission to the computer system 310. The computer system 310 receives the motion and position data through the communication interfaces 162 and 312 and converts the data into rendered frames of video to be displayed on the display 115. This process involves the GPU 316 pushing the rendered video frame from a buffer onto the display 115. In some embodiments, the buffer includes one or more line buffers 318 that store at least a portion of the video frame. Multiple line buffers may be used to buffer an entire video frame, or portions of the video frame. A "frame buffer," as used herein, refers to a buffer that may include multiple individual line buffers for multiple lines of the video frame, or an integrated buffer for the multiple lines of the video frame. In some embodiments, a frame buffer includes multiple line buffers that buffer portions of the video frame where the line buffers are updated multiple times to render the complete video frame. In some cases, multiple frames may have been rendered and buffered using multiple frame buffers. These rendered frames may be pushed out, each in turn, onto the display 115, so as to create a moving scene of rendered video. When a user adjusts his or her view of the scene being presented, even if only to a small degree, the motion and position data generated from the various sensors is updated, and the video being rendered and displayed on the display 115 of a VR headset 105 has to be regenerated.

In some VR systems, computer system 310 may process the received motion and position data to update frame buffers with rendered video frames such that when a first frame buffer is being scanned to be displayed on the display 115, a second frame buffer is being updated with new motion and position data. Similarly, when the second frame buffer is being scanned to be displayed on the display 115, a third frame buffer is being updated with new motion and position data. An advantage of this method is to avoid any screen tearing of the rendered video on display 115. A screen tear occurs when the rendered video being displayed includes data from two separate video frames instead of only one video frame. By separating the buffer being scanned for displaying video and the buffer being updated with new data, the method avoids any screen tearing. However, the separation of the buffer being updated and the other buffer being scanned increases the latency between when the sensors capture new data at the VR headset 105 and when the captured new data is being displayed on display 115. In some embodiments, the discussion herein regarding tear detection using the GPU 316 may be performed using an application specific integrated circuit (ASIC), a general purpose processor executing instructions, or some other processing device.

FIG. 3 shows the line buffers 318 and a code memory 320 as components of the GPU 316. For example, the GPU 316 may include memory that is used to implement one or more buffers. In some embodiments, multiple frame buffers may be formed from line buffers. In other example, one or more of the buffers may be on other portions of the computer system 310, such as on a board that connects the memory to the processor 314. In some embodiments, one or more of the buffers are in the VR headset 105. The code memory 320 stores identification codes associated with pixel rows of frames of video to perform tear detection. For example, the code memory 320 may store the identification code for each pixel row of a frame of video to support comparison of the identification codes for the tear detection. The code memory 320, which may be part of the GPU 316 or in some other location of the system 300. In some embodiments, a frame buffer that stores the entire frame of video including the identification codes may be used instead of line buffers 318 and code memory 320. In some embodiments, compressed video data is stored in line buffers 318, decoded, and then provided to the electronic display 115 of the VR headset 105. For example, two line buffers 318, or some other number of line buffers 318 as needed to perform the decoding, store at a time two pixel rows of a frame of video. After processing of the pixel rows of the frame, the line buffers 318 may process additional pixel rows of the frame of video, and so forth until each pixel row of the frame of video has been decoded and provided to the electronic display 115.

In virtual reality applications, it is beneficial to minimize latency between capturing new data and displaying the captured new data. One exemplary method according to embodiments herein to minimize the latency is to scan the frame buffer (e.g., one or more line buffers) that is being updated with new data while the frame buffer is still being updated with the new data. For example, each frame buffer includes data corresponding to multiple rows of pixels (e.g., 1080 rows in 1080p video). Latency can be minimized if a row of the frame buffer that is refreshed with new motion and position data is scanned soon after (e.g., immediately after or as close as possible to) the row is updated with the new data. In some embodiments, the updating of a row of pixels and scanning of the row of pixels may be separated by a few rows of pixels to reduce a risk of screen tearing. For example, if the updating and scanning are separated by four rows of pixels, row1 is scanned when row5 is being refreshed with new data and row5 is scanned when row9 is being refreshed with new data.

While the above-described exemplary method reduces the latency, it increases the risk of screen tearing. For example, while the video is typically scanned at a constant rate, the rate at which new data is updated can be affected by the status of the operating system. In one scenario, when the scan line passes the refreshing line such that a row of pixels is scanned before it is refreshed with new data, a screen tear occurs. Accordingly, screen tear should be detected when it occurs in order to take remedial steps to avoid such tears in the future.

In one embodiment, a screen tear is detected by first inserting an identification code to the data associated with each row of the rendered video frame and later analyzing the identification code corresponding to each row of the actually displayed video frame. For example, an identification code (e.g., 1-bit) is inserted to each row of each video frame such that rows of each even video frames are inserted with a '1' and rows of each odd video frames are inserted with '0.' In another example, a 2 bit identification code is inserted to each row of each video frame such rows of each frame cycle through the four unique 2 bit identification codes 00, 01, 10, and 11.

In one implementation, the identification code is inserted into the first pixel (e.g., first bit or "least significant" bit of the first pixel, if a pixel includes multiple bits) of a color channel (e.g., red channel) for each row of the video frame. Insertion of the identification code into the least significant bit (or for multi-bit identification codes, the least significant bits) may be advantageous because changes to the least significant bit of the first pixel do not dramatically alter the displayed color within the first pixel. Therefore, screen tear detection is achievable with minimal impact to pixel color quality. In another example, the identification code is inserted in the last bit or "most significant" bit (or for multi-bit identification codes, the most significant bits) of the first pixel of a color (e.g., red) channel for each row of the video frame.

In some embodiments, the video data may include "compressed video data," or video data that has been encoded using fewer bits than an original representation. Video compression may include change or elimination of non-essential detail in the video data, such as compression of video data within a frame (e.g., reduce color space, reduce color resolution, chroma subsampling, transform coding, etc.) or video data cross multiple frames (e.g., compare adjacent video frames and remove details that do not change). Prior to display, compressed video data is decoded to generate "decoded compressed video data." However, when the compressed video data is decoded, the decoded compressed video data or signal may slightly vary from the compressed video data, and this change may alter the least significant bit(s). If the identification code is placed at the least significant bit of the compressed video data, the identification code can become altered when the compressed video is decoded. Therefore, the identification code may be inserted into the most significant bit (or bits) of a first pixel in each row for a color channel of the compressed video data. For example, the compressed video data nay include multiple color channels, such as a red, green, and blue color channel. The most significant bit(s) of a pixel, such as the first pixel in each row is updated with an identification code.

When the video frames are being displayed on display 115, a determination is made at the end of each video frame to check whether there was a tear associated with the video frame. The determination includes retrieving the identification code associated with each pixel row of the video frame and analyzing identification codes across the pixel rows of the video frame to detect an occurrence of a screen tear. For example, analyzing the identification codes across the pixel rows may include checking whether the retrieved identification code (e.g., the last bit or "most significant" bit(s) of the first pixel of the red color channel when the video frame includes decoded compressed video data) has the same value for each row of the video frame. If the determination returns that all rows of the video frame have the same identification code value (e.g., for the first bit of the first pixel of the red color channel), no screen tear is detected within that video frame. If, on the other hand, one or more rows have a different value for the identification code (e.g., first bit of the first pixel of the red color channel) compared with the other rows of the video frame, a screen tear is detected within the video frame. An indication of the detected screen tear may be provided to the host computer (e.g., computer system 310) to re-render the frame of video without such screen tear and also to take remedial steps to avoid such tears in the future. In some embodiments, the code memory 320 receives the identification codes of multiple pixel rows from the line buffer 318, and stores the identification codes to facilitate the determination of whether there was a tear associated with the video frame. For example, when two line buffers 318 are used, the identification codes associated with two pixel rows stored in the line buffers 318 may be provided to the code memory 320. In other embodiments, a full frame buffer may store the pixel lines of a full frame of video including the identification codes for each line.

The detection of a screen tear in a video frame by inserting and analyzing an identification code in each row of the same video frame is referred to as in-band tear detection. In one embodiment, the in-band screen tear detection is implemented during the vertical blanking period at the end of the video frame. The in-band tear detection process can be implemented at either a driver circuit that drives the display 115 or at a bridge integrated circuit (IC) such as a MIPI-based bridge IC that can be used for communication interfaces 162 and 312.

Figure 4:
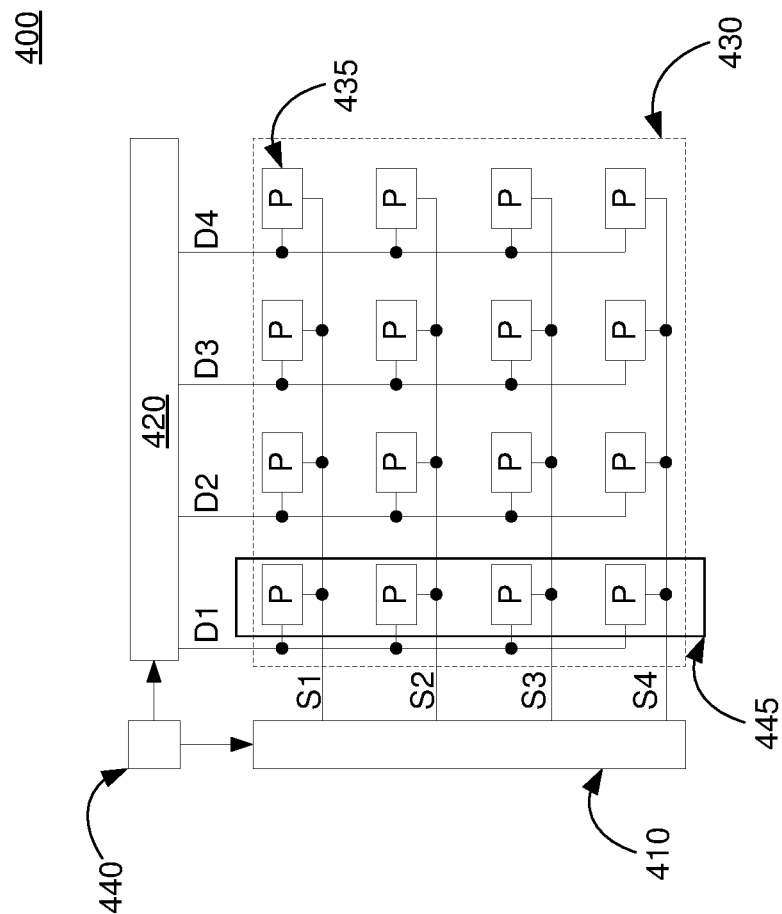
FIG. 4 is a block diagram depicting a pixel arrangement of a display device, in accordance with an embodiment.

FIG. 4 is a block diagram depicting a pixel arrangement of an organic light emitting diode (OLED) display device, in accordance with an embodiment. In one embodiment, the OLED display device of FIG. 4 can be incorporated as the electronic display 115 of the virtual reality (VR) headset 105 of VR system 100. In other embodiments is the OLED display device of FIG. 4 may be used as some other electronic display, e.g., a computer monitor, a television set, etc. The exemplary pixel arrangement of FIG. 4 includes a 4×4 pixel structure including 4 rows of pixels (pixel rows) and 4 columns of pixels (pixel columns) for simplicity of illustration, although a person skilled in the art would understand that the depicted 4×4 pixel structure is merely exemplary and that the disclosure is applicable to a pixel structure of any size, typically with millions of pixels on the OLED display 400.

Referring to FIG. 4, the OLED display device includes an OLED panel 430, a scan driver 410, a data driver 420, and a timing controller 440. The OLED panel 430 includes a plurality of scan lines S1 through S4 (i.e., S1-S4) and a plurality of data lines D1 through D4 (i.e., D1-D4). A plurality of pixel regions P are defined by the regions that the scan lines S1-S4 and data lines D1-D4 cross each other. These pixel regions P can be arranged in a matrix shape. Each of the pixel regions P (i.e., 435) is electrically connected to one of the scan lines S1-S4 and one of the data lines D1-D4. For example, the scan lines S1-S4 can be electrically connected to the plurality of pixel regions P arranged in a horizontal direction with each of the scan lines S1-S4 associated with a corresponding one of the rows of pixels. The data lines D1-D4 can be electrically connected to the plurality of pixel regions P arranged in a vertical direction with each of the data lines D1-D4 associated with a corresponding one of the columns of pixels.

The scan driver 410 applies scan signals to the pixel regions P through the scan lines S1-S4 to enable the rows associated with the activated scan line for display. The data driver 420 applies data voltages to the pixel regions P through the data lines D1-D4 to provide data voltages to the columns associated with the activated data lines. In some embodiments, a plurality of power voltage lines (not shown) can supply power voltage to the pixel regions P.

The timing controller 440 can apply digital video data RGB to the data driver 420. Also, timing controller 440 can derive timing control signals from vertical/horizontal synchronous signals and a clock signal. The timing control signals are used to control operation timings of the scan driver 410 and the data driver 420. In one embodiment, the timing controller 440 inserts the identification code into each row of video and also implements the steps involved in in-band tear detection described above.

The OLED display device 400 includes a display area used to display images and a non-display area in which any image is not displayed. The organic light-emitting panel 430 can be included in the display area. The scan driver 410, the data driver 420, and any other drivers can be included in the non-display area.

In some embodiments, such as when identification codes inserted into the most significant bit of a color channel of a (e.g., first) pixel of each pixel row, the pixels including the identification code may be occluded or hidden from user view. For example and with reference to FIG. 4, the left-most pixels P that form a column and are connected with the data line D1 represent a collection of first pixels across each pixel row, thereby forming a column of first pixels each including an inserted identification code. When the identification code is at the most significant bit or bits (e.g., 2 bits), pixel color may be noticeably altered. An opaque element 445 may be provided over the first pixels to hide the first pixels from view on the display device. The pixel of each pixel row that is to receive the identification code may be selected to form an edge-most (e.g., left-most as shown in FIG. 4) column of hidden first pixels dedicated to screen tear detection, and the opaque element 445 may be disposed along the corresponding edge to hide the edge-most column of first pixels. "Opaque" as used herein refers to the capability of the element 445 to prevent light emitted from the underlying first pixels from propagating through the element 445, thereby hiding the first pixels and their outputs from view. The opaque element 445 may be any suitable structure, such as a material layer deposited over the first pixels or a separate object (e.g., a bezel) disposed over the first pixels.

The discussion herein with respect to pixel "rows" does not necessarily refer to a horizontal row as shown in FIG. 4, and could refer to a vertical row (e.g., depending on reference orientation). Similarly, the "first pixel" of a pixel row does not necessarily refer to the left-most pixel of each pixel row as shown in FIG. 4, and could refer to a different pixel of the pixel rows (e.g., the right-most pixel of each pixel row).

FIG. 5 is a flow chart of a process 500 for generating a frame of video including identification codes from compressed video data, in accordance with an embodiment. The process 500 is discussed as being performed by the in-band tear detection system 300, although other suitable components may be used. Likewise, embodiments may include different and/or additional steps, or perform the steps in different orders.

A processor, such as the processor 314 or some remote processor, inserts 505, for each pixel row of a video frame defined by compressed video data, an identification code in one or more of the most significant bits a pixel of the pixel row. The processor 314 may be executing an application to generate the compressed video data, or may access the compressed video data from another source. The compressed video data may include compressed pixel values for each of the pixels of the video frame. Furthermore, each pixel may include sub-pixel values for different color channels, such as a red, green, and blue sub-pixel value for each pixel. The identification code may be inserted in a first (e.g., left-most) pixel in each of the pixel rows, or some other dedicated pixel in each of the pixel rows. The identification code is inserted in the most significant bit of a sub-pixel value, such as the sub-pixel value for the red channel, green channel, or blue channel. Each sub-pixel value may include a string of bits when decoded.

Because the compressed video data has compressed sub-pixel values (also referred to as pixel values), the identification code is inserted in one or more most significant bits. While video encoding, such as compression, can result in the loss of data in the least significant bit(s), the one or more most significant bits typically cannot be altered without significantly changing the sub-pixel values, and thus compression and decompression processes are unlikely to alter the most significant bits.

In some embodiments, the identification code is inserted in one or more of the most significant bits a pixel of the pixel row the video frame, and then the video frame (or a sequence of video frames) are encoded into the compressed video data. In other embodiments, the video frame is encoded into compressed video data, and then the identification code is inserted in the bits.

The processor 314 or GPU 316 generates 510 the frame of video by decoding the compressed video data. For example, when the frame of video is to be displayed on the electronic display 115, the processor 314 or GPU 316 may decode the compressed video data. The decoding of the compressed video data does not alter the identification codes which were inserted in the one or more most significant bits of a pixel (or more specifically, a sub-pixel value of a color channel of the pixel), and thus the frame of video also includes the identification codes despite the decoding. In some embodiments, the GPU 316 sends pixel rows of the video frame to one or more line buffers 318. The pixel rows within line buffers 318 are decoded into decompressed video data while in the line buffers 318, and the pixel rows of the decompressed video data are provided to the electronic display 115. Furthermore, the identification codes in the line buffers 318 are retrieved and stored in the code memory 320.

The processor 314 or GPU 316 sends 515 the frame of video to the electronic display 115. For example, the decompressed video data stored in the line buffers 318 may be sent to the electronic display 115. In some embodiments, the decompressed video data is stored in a frame buffer of the GPU 316, or some other buffer for the electronic display 115. When in a frame buffer, the electronic display 115 may access the subpixel values in the frame buffer to display the frame of video. In some embodiments, the sub-pixel values of the frame of video are loaded into the frame buffer in a raster-like fashion.

As discussed above, the most significant bit of the first pixel of each pixel row may be encoded with the identification code. This results in sub-pixel values of the left-most column of pixels being altered from the original frame of video for the purpose of screen tear detection. As such, and opaque element 445 as shown in FIG. 4 may be used to cover the left-most column of pixels so that the screen tear detection process does not interfere with the quality of presentation. Although placing the identification code in the least significant bit or a less significant bit would result in less alteration in the displayed pixel, such a technique is unsuitable when the video frame is compressed and decompressed because the least significant bit can be dropped or altered in the process.

Figure 6:
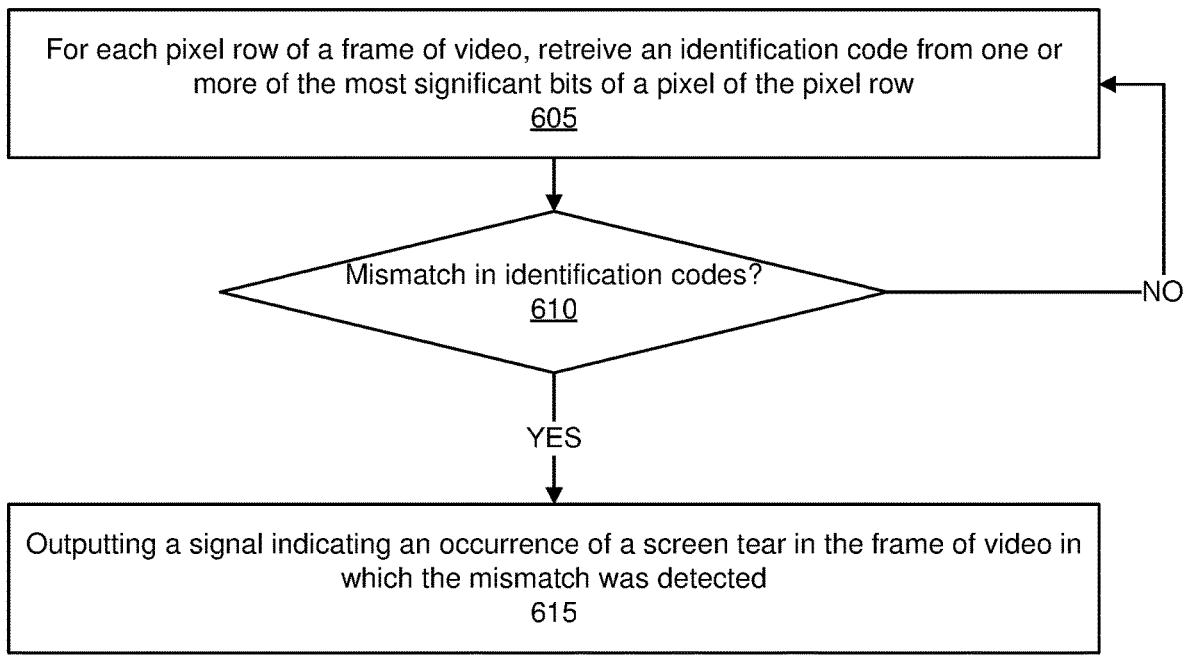
FIG. 6 is a flow chart of a process for detecting a screen tear in a frame of video, in accordance with an embodiment.

FIG. 6 is a flow chart of a process 600 for detecting a screen tear in a frame of video, in accordance with an embodiment. The process 600 may be performed after the compressed video data including the identification codes is decoded into the frame of video as discussed above in the process 500 and FIG. 5. The process 600 is discussed as being performed by the in-band tear detection system 300, although other suitable components may be used. Likewise, embodiments may include different and/or additional steps, or perform the steps in different orders. In some embodiments, the process 600 is performed during a vertical blanking period after the frame of video in a frame buffer has been scanned by the electronic display 115 and prior to a subsequent frame of video being programmed into the frame buffer.

A timing controller 440 of the electronic display, or some other processor, retrieves 610, for each pixel row of the frame of video, an identification code from one or more of the most significant bits a pixel in the pixel row. For example, the identification codes that were inserted at 505 of the process 500 may be retrieved. In some embodiments, the identification codes for the frame are accessed from a code memory 320 which receives the identification for pixel rows in the line buffers 318. In other embodiments, identification codes may be accessed from a frame buffer that stores the frame including the identification codes.

The timing controller 440 determines 615 whether there is a mismatch between identification codes of at least two of the pixel rows of the video frame. For example, if an identification code of "0" has been inserted into the pixel in each pixel row, than the timing controller 440 determines whether each pixel row has the identification code 0 in the inserted pixel. In another example, adjacent video frames in a sequence of video frames may include pixel rows with different identification codes, such as "0" for even video frames and "1" for odd video frames. In general, the identification codes in each pixel row of each frame of video should match the inserted identification codes or a screen tear may be detected.

In response to determining a mismatch in the identification codes of at least two of the pixel rows of the video frame, the timing controller 440 outputs 620 a signal indicating an occurrence of a screen tear in the frame of video in which the mismatch was detected.

Returning to 614, in response to determining a lack of a mismatch in the identification codes the pixel rows of the video frame, the process returns to 605, where the timing controller 440 receives 605 another frame of video, such as a subsequent frame of video, in the frame buffer. The process 600 may be repeated for multiple frames of video to detect occurrence screen tears in each of the frames of video. In some embodiments, the timing controller 440 outputs a signal indicating the lack of a screen tear for the frame of video.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   for each pixel row of a frame of video stored in one or more buffers of a display: retrieving an identification code from only a most significant bit of a pixel of the pixel row from a buffer, wherein a color of the pixel of the pixel row is defined by a number of bits, the number of bits including the most significant bit, all pixel rows of even numbered frames of the video including a first identification code and all pixel rows of odd numbered frames of the video including a second identification code;
   detecting a mismatch between identification codes of at least two of the pixel rows of the frame of video;
   responsive to detecting the mismatch, outputting a signal indicating an occurrence of a screen tear in the frame of video presented by the display; and
   occluding the pixel of each pixel row of the frame of video from view on the display device with an opaque element disposed over the pixel of each pixel row.

2. The method of claim 1, wherein the frame of video includes decoded compressed video data.

3. The method of claim 1 further comprising generating the frame of video by decoding compressed video data.

4. The method of claim 3 further comprising inserting the identification code associated with each pixel row of the frame of video into the compressed video data before the compressed video is decoded.

5. The method of claim 1, wherein the identification code associated with the pixel row of the frame of video is inserted into a first pixel of a color channel of the pixel row.

6. The method of claim 5, wherein bits of the pixel of the pixel row represent a color channel value.

7. The method of claim 1, further comprising:
for each pixel row of a second frame of video, retrieving an identification code from only a most significant bit of a pixel of the pixel row;
detecting a lack of a mismatch between the retrieved identification codes of the pixel rows of the second frame of video; and
responsive to detecting the lack of the mismatch, outputting a signal indicating no occurrence of a screen tear in the second frame of video.

8. The method of claim 1, wherein the detecting the mismatch is performed during a vertical blanking period after the frame of video has been scanned by the display device.

9. A system, comprising:
a display panel configured to present a frame of video;
one or more buffers configured to store the frame of video presented by the display panel;
a timing controller configured to:
for each of multiple pixel rows of the frame of video stored in the one or more buffers, retrieve an identification code from only a most significant bit of a pixel of the pixel row from a buffer, wherein a color of the pixel of the pixel row is defined by a number of bits, the number of bits including the most significant bit, a first set of pixel rows of a first group of frames of the video including a first identification code and a second set of pixel rows of a second group of frames of the video including a second identification code;
detect a mismatch between identification codes of at least two of the pixel rows of the frame of video; and
responsive to detecting the mismatch, output a signal indicating an occurrence of a screen tear in the frame of video presented by the display panel; and
an opaque element disposed over the pixel of each pixel row.

10. The system of claim 9, wherein:
the frame of video is generated by decoding compressed video data including the identification code associated with each pixel row of the frame of video; and
the identification code associated with each pixel row of the frame of video is inserted into the compressed video data before the compressed video is decoded.

11. The system of claim 9, wherein the identification code associated with the pixel row of the frame of video is inserted into a first pixel of a color channel of the pixel row.

12. The system of claim 11, wherein bits of the pixel of the pixel row represent a color channel value.

13. The system of claim 9, wherein the timing controller is further configured to:
for each pixel row of a second frame of video, retrieve an identification code from only a most significant bit of a pixel of the pixel row;
detecting a lack of a mismatch between the retrieved identification codes of the pixel rows of the second frame of video; and
responsive to detecting the lack of the mismatch, output a signal indicating no occurrence of a screen tear in the second frame of video.

14. The system of claim 9, wherein the timing controller is configured to detect the mismatch during a vertical blanking period after the frame of video has been scanned by the display panel.

* * * * *